(12) United States Patent
Murray et al.

(10) Patent No.: US 7,794,194 B2
(45) Date of Patent: Sep. 14, 2010

(54) PICK AND PLACE WORK PIECE FLIPPER

(75) Inventors: Michael Thomas Murray, Ardmore, OK (US); John William Rigsby, Longmont, CO (US); Sabrina Lynn Murray, Ardmore, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 342 days.

(21) Appl. No.: 11/855,928

(22) Filed: Sep. 14, 2007

(65) Prior Publication Data

US 2009/0074555 A1 Mar. 19, 2009

(51) Int. Cl.
*H01L 21/68* (2006.01)
*B66C 1/00* (2006.01)

(52) U.S. Cl. .................. 414/783; 414/627; 414/732; 414/737; 414/759; 901/38; 901/40; 74/68

(58) Field of Classification Search ................ 294/106, 294/119; 141/124; 414/226.01, 732, 735, 414/737, 739, 754, 758–767, 769, 771, 773–776, 414/778–783, 917, 936; 74/490.01, 490.05, 74/490.06, 68; 901/15–16, 36–38, 40, 6
See application file for complete search history.

(56) References Cited

U.S. PATENT DOCUMENTS

| | | | | |
|---|---|---|---|---|
| 3,262,593 A * | 7/1966 | Hainer | ................ | 414/619 |
| 4,341,502 A * | 7/1982 | Makino | ................ | 414/744.1 |
| 4,564,332 A * | 1/1986 | Orii | ................ | 414/759 |
| 5,190,333 A * | 3/1993 | Minichan et al. | ................ | 294/86.41 |
| 5,234,314 A * | 8/1993 | Ganz | ................ | 414/797.8 |
| 5,256,027 A * | 10/1993 | Guest | ................ | 414/737 |
| 5,330,043 A * | 7/1994 | Stuckey | ................ | 198/346.2 |
| 5,374,158 A * | 12/1994 | Tessier et al. | ................ | 414/759 |
| 6,003,400 A * | 12/1999 | Rauchfuss | ................ | 74/490.06 |
| 6,234,742 B1 * | 5/2001 | Rodefeld et al. | ................ | 414/771 |
| 6,339,969 B1 | 1/2002 | Salcudean et al. | | |
| 6,623,235 B2 | 9/2003 | Yokota et al. | | |
| 6,748,819 B2 | 6/2004 | Maeguchi et al. | | |
| 6,852,007 B1 | 2/2005 | Gonzalez et al. | | |
| 6,969,227 B2 | 11/2005 | Kinnard et al. | | |
| 6,976,823 B2 * | 12/2005 | Maeda | ................ | 414/759 |

* cited by examiner

*Primary Examiner*—Gregory W Adams
(74) *Attorney, Agent, or Firm*—McCarthy Law Group

(57) ABSTRACT

An apparatus and associated method is provided for individually positioning first and second input links of a four-bar linkage to move first and second follower links pivotally joined therebetween in order to move a chuck supported by one of the follower links between a retracted position and an extended position.

20 Claims, 3 Drawing Sheets

PICK AND PLACE WORK PIECE FLIPPER

BACKGROUND

Machinery and methods employed in the manufacturing industry have been continuously shaped by a number of market and business forces. For example, many manufactured products today are relatively more complex than those in the past, as high technology electronics have proliferated to become integrated even into commonly used consumer goods. Flexibility is key to a manufacturer's survival, as smaller lot runs of products having different feature sets must be produced on the same production line. And while the list of feature offerings continually grows, the opposite is true for the size in which they are packaged, because miniaturization and portability are important market factors as well. Add to the mix the fact that price demands have forced a greater emphasis on efficiency to the extent that processing station cycle time is scrutinized to a fraction of a second.

To keep pace with these evolving factors manufacturers are continually striving to replace manual operations with highly-complex and processor-controlled automated systems. Successful efforts have also been employed to reengineer the factory to assemble all components just-in-time instead of batch processing. Product design and process capability analyses are directed toward building quality into the process rather than inspecting it into the product. Ultimately, the measure of quality for an entire manufacturing operation depends on the quality of each of its numerous process steps.

These and other recent improvements in the art have significantly enhanced the manufacturer's ability to manufacture quality products at a competitive price. It is to the furthering of those efforts that the embodiments of the present invention are directed.

SUMMARY

Embodiments of the present invention are generally directed to tooling devices used in a manufacturing process.

In some embodiments an apparatus and associated method is provided for individually positioning first and second input links of a four-bar linkage to move first and second follower links pivotally joined therebetween in order to move a chuck supported by one of the follower links between a retracted position and an extended position.

These and various other features and advantages which characterize the claimed embodiments will become apparent upon reading the following detailed description and upon reviewing the associated drawings.

DETAILED DESCRIPTION

Figure 1:
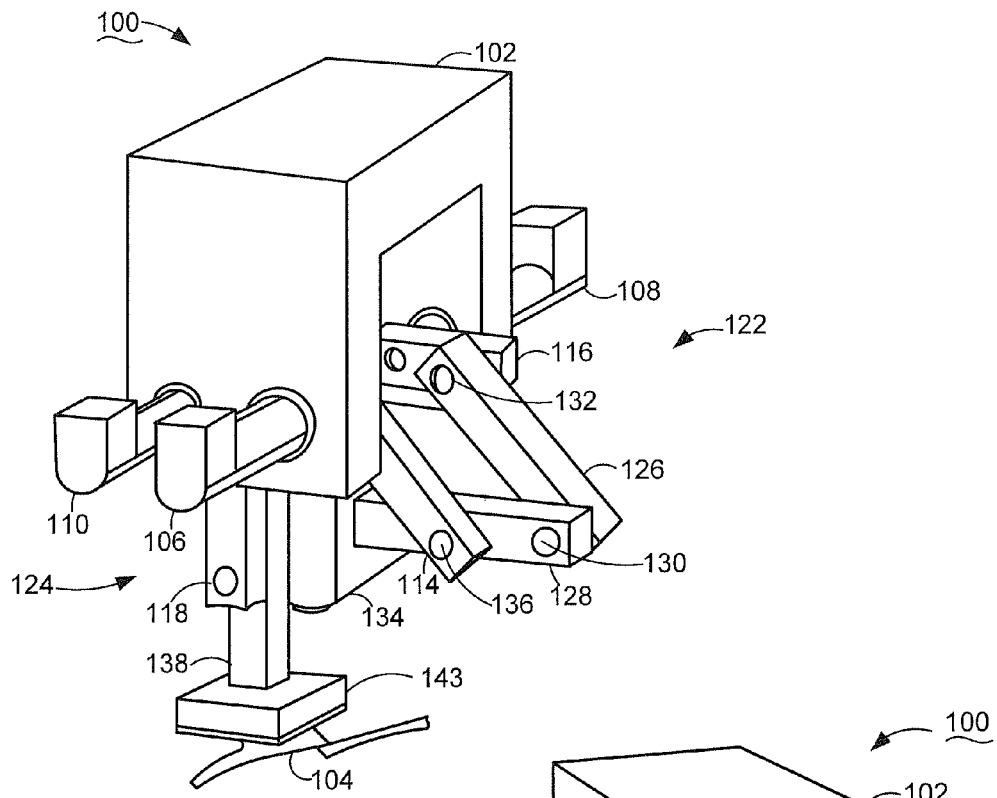
FIG. 1 is an isometric depiction of an end effector constructed in accordance with embodiments of the present invention and in the place mode.
Figure 2:
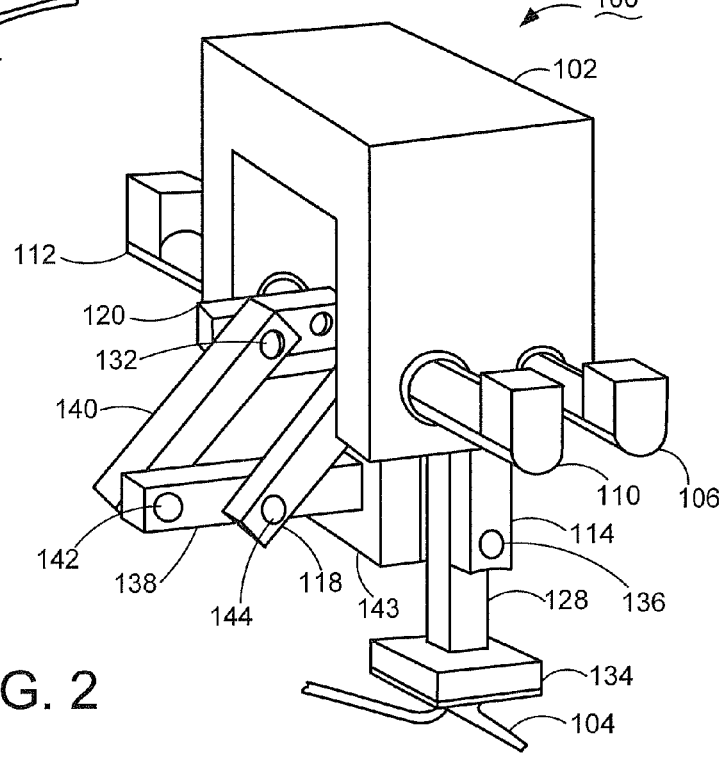
FIG. 2 is an isometric depiction of the end effector of FIG. 1 from another viewpoint and in the pick mode.

Referring to the drawings in general, and more particularly to FIGS. 1 and 2 that show two different perspectives of an end effector 100 that is constructed in accordance with embodiments of the present invention, and manipulated to be in the place mode and the pick mode, respectively. The end effector 100 has a main body 102 that can be attached to a robotic arm (not depicted) and used to pick and place components 104. For example, the end effector 100 can be used to individually transfer each of a plurality of the components 104, such as from a transport tray to a point of assembly. The end effector 100 is particularly useful in its ability to flip the component 104 while picking and placing it with the use of a single robotic arm, whether it be a one, two, or three axis type of robotic arm. The end effector 100 of the present embodiments is also particularly beneficial in that it can flip the component 104 independently of any manipulation by the robotic arm itself, making it possible to use a smaller and less expensive one or two axis robotic arm instead of a three axis one.

The body 102 supports two pair of opposing rotary positioners 106, 108 and 110, 112. Preferably, the positioners 106, 108 and 110, 112 are individually controlled electrical motors, such as an encoder or servo motor. Each positioner 106, 108 and 110, 112 has an output shaft fixed in rotation to one end of a respective input link 114, 116 and 118, 120, which are parts of a first four-bar linkage 122 and a second four-bar linkage 124. For purposes of this description and meaning of the appended claims, the term "input link" means that in terms of mechanical action it is a link in a multi-bar linkage to which an external force is directly applied to rotate it. In this manner, the input links 114, 116 and 118, 120 are independently journaled by the respective positioners 106, 108 and 110, 112 to which they are fixed in rotation.

The first four-bar linkage 122 has a pair of follower links 126, 128 joined by a pivot 130 at proximal ends thereof. For purposes of this description and meaning of the appended claims, the term "follower link" means a link that is joined to and thereby responsive to an input link, whether it be directly or indirectly joined to the input link. A distal end of the follower link 126 is joined to the input link 116 by pivot 132. A first chuck 134, such as but not limited to a vacuum type chuck, is attached to a distal end of the other follower link 128. For purposes of illustration the first chuck 134 is referred to herein as the "pick chuck" 134. The other input link 114 is joined to the follower link 128 by pivot 136. In the illustrative embodiments of FIG. 1 the pivot 136 is depicted as preferably being medially disposed in the follower link 128 between the pick chuck 134 and the pivot 130, although the present embodiments are not so limited.

The second four-bar linkage 124 mirrors the first four-bar linkage 122. FIG. 2 shows it has a pair of follower links 138, 140 joined by a pivot 142 at proximal ends thereof. A distal end of the follower link 140 is joined to the input link 120 by pivot 132. A second chuck 143, again such as but not limited to a vacuum type chuck, is attached to a distal end of the other follower link 138. For purposes of illustration the second chuck 143 is referred to herein as the "place chuck" 142. The other input link 118 is joined to the follower link 138 by pivot 144. In the illustrative embodiments of FIG. 2 the pivot 144 is depicted as preferably being medially disposed in the follower link 138 between the place chuck 143 and the pivot 142, although the present embodiments are not so limited.

By a controlled positioning of the motors 106, 108 the input links 114, 116 are selectively moveable to move, in turn, the pick chuck 134 between the retracted position of FIG. 1 and the extended position of FIG. 2. That is, by a controlled opposite rotation of the input links 114, 116 the pick chuck 134 is moved along an arcuate trajectory as the pivot 136 translates downward while the pivot 132 translates upward.

Likewise, by a controlled positioning of the motors 110, 112 the input links 118, 120 are selectively moveable to move, in turn, the place chuck 143 between the extended position of FIG. 1 and the retracted position of FIG. 2. Because the motors 106, 108 and 110, 112 are individually controlled and the four-bar linkages 122, 124 are separate, the chucks 134, 143 are extendable and retractable independently of each other.

Figure 3:
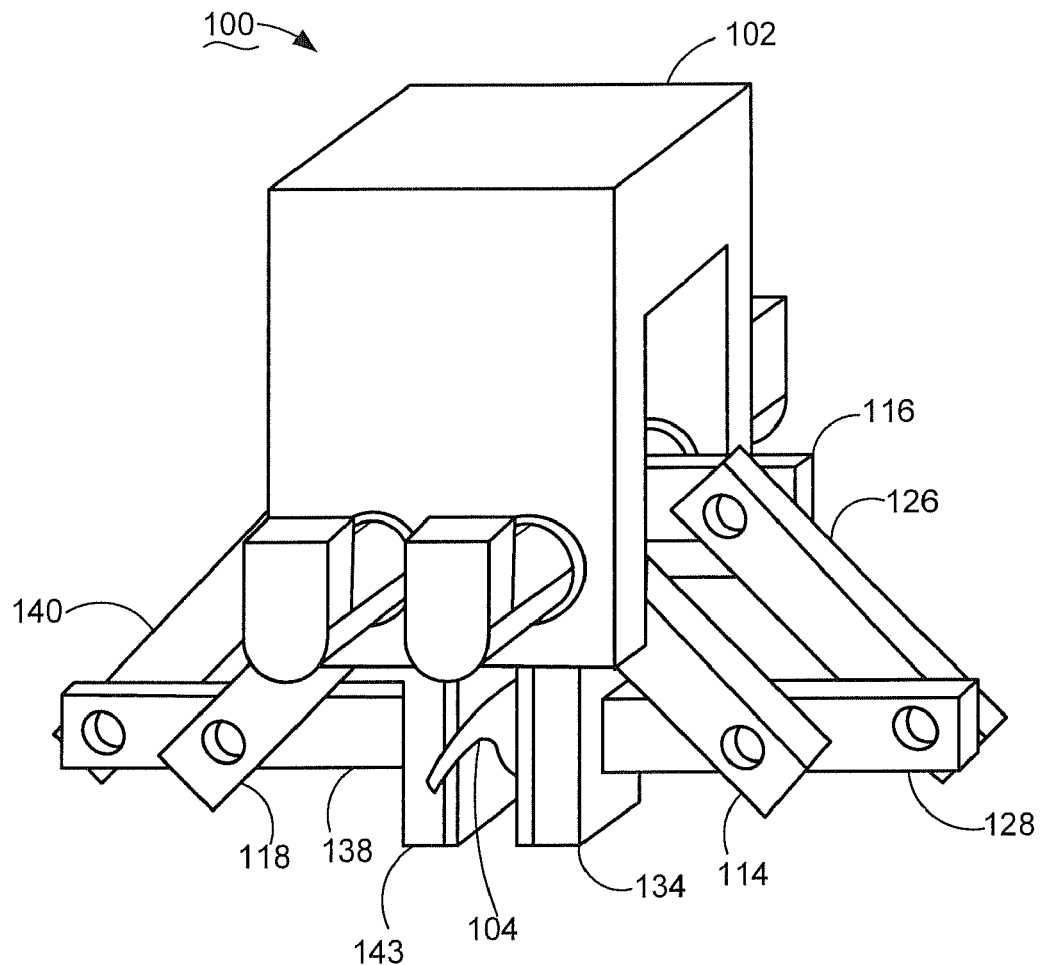
FIG. 3 is an isometric depiction of the end effector of FIG. 1 in the handoff mode.

FIG. 3 depicts a handoff position whereby both chucks 134, 143 are retracted to achieve an opposed facing relationship in order to operably engage opposing sides of the component 104. In the illustrative case of using vacuum type chucks, the component 104 is initially picked by activating the vacuum chuck 134 to grippingly engage the component 104. In the handoff position of FIG. 3 the place chuck 143 can then also be activated so that both chucks 134, 143 grippingly engage the component 104. Finally, the pick chuck 134 can be deactivated so that only the place chuck 143 grippingly engages the component 104.

In the handoff position of FIG. 3 the chucks 134, 143 are aligned for simultaneously gripping the component 104. That is, in the handoff position the respective follower links 128, 138 are longitudinally disposed along a common substantially horizontal axis. By cooperatively rotating both input links 114, 116 in the same direction, the pick chuck 134 can approach and move away from the handoff position while maintaining the substantially horizontal disposition of the follower link 128. Likewise, by cooperatively rotating both input links 118, 120 (120 shown in FIG. 2) in the same direction, the place chuck 143 can approach and move away from the handoff position while maintaining the substantially horizontal disposition of the follower link 138. This permits the chucks 134, 143 to move into and out of the handoff position while remaining in collinear alignment with each other to prevent imparting shear forces to the component 104 that might damage it. In other cases, however, the chucks 134, 143 can approach and move away from each other in the relatively less complex and faster continuous arcuate trajectories if the component 104 is robust enough to withstand any such associated shear forces.

Figure 4:
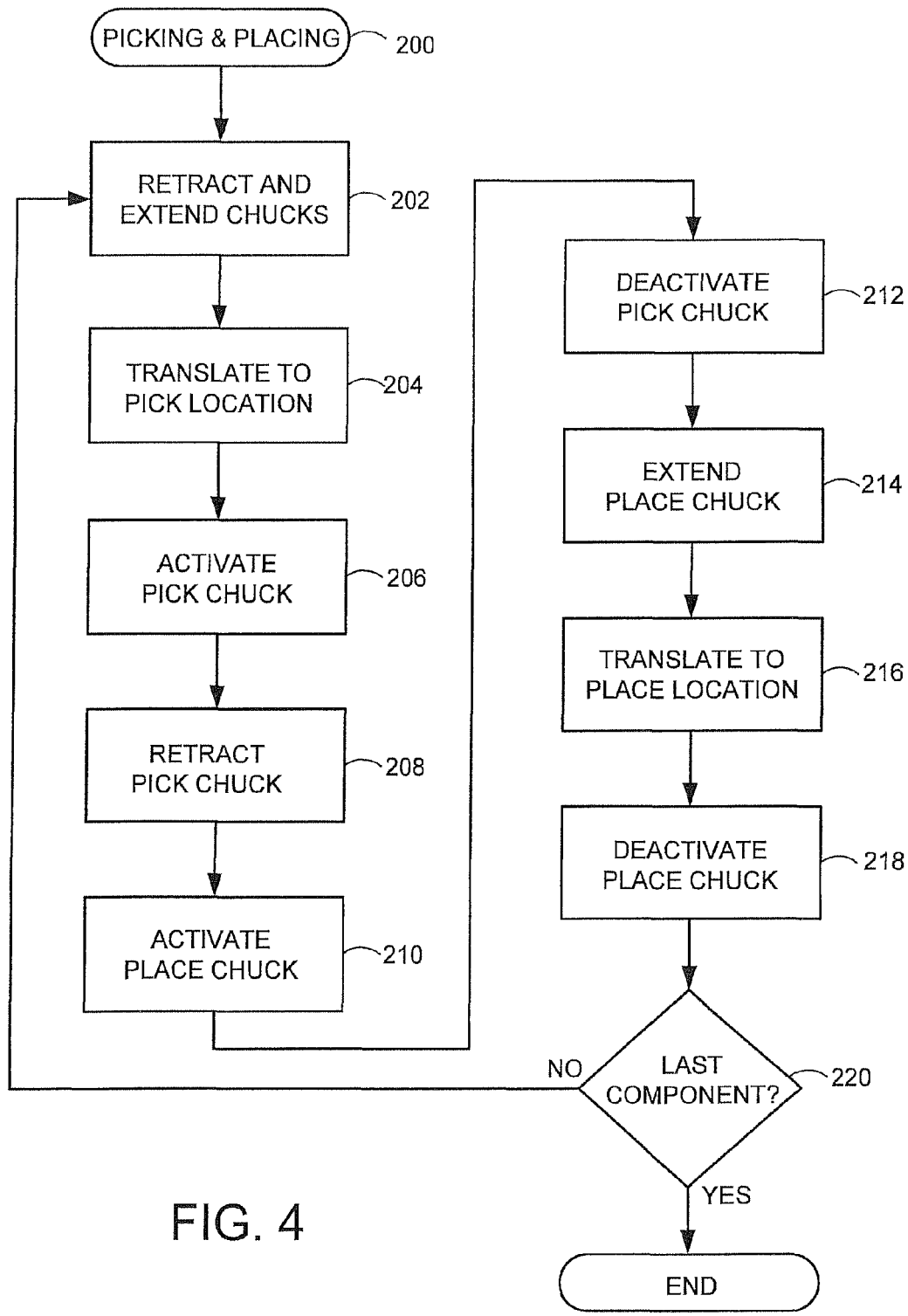
FIG. 4 is a flowchart depicting steps in a method for PICKING AND PLACING in accordance with embodiments of the present invention.

FIG. 4 is a flowchart depicting steps in an illustrative method 200 for PICKING AND PLACING in accordance with embodiments of the present invention. The method begins in step 202 by retracting the place chuck 143 and extending the pick chuck 134 as shown in FIG. 2. It will be noted that the place chuck 143 does not necessarily have to be retracted during pick operations, but usually it is advantageous to do so because it effectively reduces the footprint of the end effector 100 for clearing non-picked work pieces.

In block 204 the end effector 100 and/or a work piece, such as the component 104, is translationally moved in order to place the pick chuck 134 adjacent the work piece at the pick location. The pick chuck 134 is activated in block 206 in order to grippingly engage the work piece. With the work piece now in tow, the pick chuck 134 is retracted to meet the place chuck 143 in the handoff position of FIG. 3. The place chuck 143 can then be activated momentarily in block 210 so that the work piece is momentarily grippingly engaged by both chucks 134, 143. Once the place chuck 143 has achieved a gripping engagement, the pick chuck 134 is deactivated in block 212. The place chuck 143 can then be extended in block 214 and it and/or another work article translationally moved in block 216 in order to place the place chuck 143 at the place location. The place chuck 143 is then deactivated in block 218 to release its gripping engagement on the work piece. In block 220 it is determined whether the last component has been processed. If the determination of block 220 is no, then control returns to block 202; otherwise, the end effector 100 can be parked at a desired state and readied for the next time the method 200 is employed.

Generally, the embodiments described contemplate a material handling apparatus having an end effector linkage assembly that is operable between a retracted position and an extended position for picking and placing a component, and means for positioning the linkage assembly in order to flip the component while it is being picked and placed. For purposes of this description and meaning of the appended claims, the phrase "means for positioning" expressly means the structural aspects of the embodiments disclosed herein and the structural equivalents thereof. For example, without limitation, the disclosed use of four-bar linkages is illustrative of and not limiting of the present embodiments as claimed. For example, one may choose to use fewer or more than four links in each of the linkages that position the respective chuck in response to controlled movements of the input link or links. Furthermore, the substantially vertical and horizontal dispositions of the follower links supporting the chucks at the extended and retracted positions, respectively, is likewise illustrative and not limiting of the present embodiments as claimed. For example, in other embodiments the end effector 100 can pick/place and handoff at any desired spatial orientation, and the associated controlled movement of the input links can be compensated for the effects of gravity as need be.

The meaning of "means for positioning" expressly does not include attempted solutions that require other structure that is external to the end effector 100 to achieve the flipping operation. For example, the present embodiments as claimed by the "means for positioning" language expressly does not contemplate an arrangement whereby a pick chuck would pick the work piece and place it to an external flipping nest mechanism, wherein flipping the work piece occurs while neither the pick chuck nor the place chuck is grippingly engaging the work piece. For another example, the present embodiments as claimed by the "means for positioning" language expressly does not contemplate using a pick chuck on one robotic arm and a place chuck on a different robotic arm. Rather, the novelty of the present embodiments as claimed advantageously performs the flipping step without the additional expenditures of cost and space needed for a two-robot solution.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a pick and place operation, it will be appreciated by those skilled in the art that the claimed subject matter is not so limited and various other systems where work pieces are transported and possibly flipped can utilize the present embodiments without departing from the spirit and scope of the claimed invention.

What is claimed is:

1. An end effector apparatus for a component handling assembly comprising:
   a first linkage comprising:
      opposing first and second input links that are journaled for rotation;
      first and second positioners for selectively rotating the first and second input links, respectively; and
      first and second follower links pivotally joined together, wherein the first follower link is pivotally connected to the first input link, a first chuck is supported by the second follower link, and the second input link is pivotally connected to the second follower link; and
   a second linkage comprising:
      opposing third and fourth input links that are journaled for rotation;
      third and fourth positioners for selectively rotating the third and fourth input links, respectively; and
      third and fourth follower links pivotally joined together, wherein the third follower link is pivotally connected to the third input link, a second chuck is supported by the fourth follower link, and the fourth input link is pivotally connected to the fourth follower link.

2. The apparatus of claim 1 wherein the first and second input links are selectively moveable to move the first chuck, in turn, between a retracted position and an extended position, and wherein the third and fourth input links are selectively moveable to move the second chuck, in turn, between a retracted position and an extended position independently of the first chuck.

3. The apparatus of claim 2 wherein the first chuck and second chuck are selectively moveable in the retracted positions to an opposed facing relationship in order to operably engage opposing sides of a component interposed therebetween.

4. The apparatus of claim 3 wherein the chucks operably engage the component with a vacuum force, and wherein a component can be handed off from one of the chucks to the other of the chucks by selectively communicating the vacuum force to one or both of the chucks.

5. The apparatus of claim 1 wherein the first and second input links and first and second follower links mirror the third and fourth input links and third and fourth follower links.

6. The apparatus of claim 1 wherein the chucks are moveable toward each other and away from each other while remaining in collinear alignment with each other in the retracted positions.

7. The apparatus of claim 1 wherein the first and second positioners comprise first and second motors.

8. The apparatus of claim 7 wherein the first input link is fixed in rotation with a first shaft of the first motor and the second input link is fixed in rotation with a second shaft of the second motor, the first and second shafts being operably rotatable around a collinear axis of rotation.

9. The apparatus of claim 1 wherein the first and second follower links are joined together at a first pivot, the first chuck being supported by the second follower link remotely from the first pivot.

10. The apparatus of claim 9 wherein the second input link is joined to the second follower link at a second pivot between the first pivot and the first chuck.

11. The apparatus of claim 10 wherein the third and fourth follower links are joined together at a third pivot, the second chuck being supported by the fourth follower link remotely from the third pivot, and the fourth input link joined to the fourth follower link at a fourth pivot between the third pivot and the second chuck.

12. A method for flipping a component with a pick and place material handling end effector comprising:
   individually positioning first and second input links of a first linkage to move first and second follower links pivotally joined therebetween in order to move a first chuck supported by one of the follower links between a retracted position and an extended position; and
   individually positioning third and fourth input links of a second linkage to move third and fourth follower links pivotally joined therebetween in order to move a second chuck supported by one of the third and fourth follower links between a retracted position and an extended position independently of the first chuck.

13. The method of claim 12 comprising individually positioning the first and second input links to move the first chuck to the extended position, and grippingly engaging a component with the first chuck.

14. The method of claim 13, before the grippingly engaging step, comprising translationally moving at least one of the first linkage and the component to place them adjacent to one another.

15. The method of claim 13, before the grippingly engaging step, comprising individually positioning the third and fourth input links to move the second chuck to the retracted position.

16. The method of claim 13 comprising:
   individually positioning the third and fourth input links to move the second chuck to the retracted position; and
   after the grippingly engaging step, individually positioning the first and second input links to move the first chuck to the retracted position.

17. The method of claim 16 comprising positioning at least one of the first and second input links and the third and fourth input links and grippingly engaging opposing sides of the component with both chucks simultaneously.

18. The method of claim 17, following the grippingly engaging with both chucks simultaneously step, comprising releasing the gripping engagement by the first chuck.

19. The method of claim 18, comprising individually positioning at least one of the first and second input links and the third and fourth input links to move the second chuck to an extended position.

20. The method of claim 19 comprising releasing the gripping engagement of the second chuck to place the component in a flipped orientation with respect to its orientation when it was picked during the grippingly engaging step.

* * * * *